(12) United States Patent
Prinz et al.

(10) Patent No.: US 11,865,772 B2
(45) Date of Patent: Jan. 9, 2024

(54) THERMAL INSULATION FASTENING SYSTEM

(71) Applicant: Kolibri Metals GmbH, Amtzell (DE)

(72) Inventors: Christian Prinz, Hergatz (DE); Maximilian Bronner, Berg (DE); Axel Wittig, Wangen (DE)

(73) Assignee: Kolibri Metals GmbH, Amtzell (DE)

( * ) Notice: Subject to any disclaimer, the term of this patent is extended or adjusted under 35 U.S.C. 154(b) by 33 days.

(21) Appl. No.: 17/647,823

(22) Filed: Jan. 12, 2022

(65) Prior Publication Data
US 2022/0219393 A1 Jul. 14, 2022

Related U.S. Application Data

(63) Continuation of application No. 16/543,133, filed on Aug. 16, 2019, now abandoned.

(30) Foreign Application Priority Data

Aug. 17, 2018 (DE) .......................... 102018120083.8
Oct. 10, 2018 (DE) .......................... 102018124975.6

(51) Int. Cl.
*B29C 64/153* (2017.01)
*B22F 10/28* (2021.01)
*B33Y 80/00* (2015.01)
*B29C 64/245* (2017.01)
*B29C 64/255* (2017.01)
(Continued)

(52) U.S. Cl.
CPC ............ *B29C 64/153* (2017.08); *B22F 10/28* (2021.01); *B22F 10/40* (2021.01); *B29C 64/245* (2017.08); *B29C 64/255* (2017.08); *B29C 64/295* (2017.08); *B33Y 80/00* (2014.12); *B22F 10/73* (2021.01); *B22F 12/90* (2021.01);
(Continued)

(58) Field of Classification Search
CPC ... B29C 64/153; B29C 64/245; B29C 64/255; B29C 64/295; B33Y 80/00; B22F 10/40; B22F 10/28
See application file for complete search history.

(56) References Cited

U.S. PATENT DOCUMENTS 5,705,117 A * 1/1998 O'Connor ............. B29C 64/135
264/401
6,682,688 B1 1/2004 Higashi et al.
(Continued)

*Primary Examiner* — Joseph S Del Sole
*Assistant Examiner* — John Robitaille
(74) *Attorney, Agent, or Firm* — Slater Matsil, LLP

(57) ABSTRACT

A method for making a component at a device is disclosed. In an embodiment the device includes a powder depot, a work space and a laser, wherein the work space includes a powder bed and an assembly, and wherein the assembly includes a thermally insulating embedding mass and a heat conducting mold. In a further embodiment, the method includes fastening, by the assembly, an element at the work space and forming the component at the element by repeatedly moving, by a wiper, powder from the powder depot to the powder bed at the work space and heating, by a laser beam of the laser in an additive process, portions of the powder in the powder bed so that the component is built on the element, wherein the additive process comprises selective laser melting (SLM) or selective laser sintering (SLS), and wherein the embedding mass is independent and distinct from the powder and the component.

22 Claims, 4 Drawing Sheets

(51) Int. Cl.
*B29C 64/295* (2017.01)
*B22F 10/40* (2021.01)
*B33Y 10/00* (2015.01)
*B33Y 30/00* (2015.01)
*B29C 64/268* (2017.01)
*B22F 10/73* (2021.01)
*B22F 12/90* (2021.01)

(52) U.S. Cl.
CPC ............ *B29C 64/268* (2017.08); *B33Y 10/00* (2014.12); *B33Y 30/00* (2014.12)

(56) References Cited

U.S. PATENT DOCUMENTS

| | | |
|---|---|---|
| 9,597,730 B2 | 3/2017 | Mironets et al. |
| 2010/0176539 A1 | 7/2010 | Higashi et al. |
| 2011/0293771 A1 | 12/2011 | Oberhofer et al. |
| 2016/0107229 A1 | 4/2016 | Ozazaki et al. |
| 2017/0056975 A1 | 3/2017 | Carter et al. |
| 2017/0120337 A1* | 5/2017 | Kanko ................... B33Y 10/00 |
| 2017/0129181 A1* | 5/2017 | Kunioka ............... B29C 64/295 |
| 2019/0193333 A1 | 6/2019 | Braunroth |

\* cited by examiner

THERMAL INSULATION FASTENING SYSTEM

CROSS-REFERENCE TO RELATED APPLICATIONS

This is a continuation application of U.S. application Ser. No. 16/543,133, entitled "Thermal Insulation Fastening System," which was filed on Aug. 16, 2019, which claims priority to German Patent Application No. 102018120083.8, filed on Aug. 17, 2018, and German Patent Application No. 102018124975.6, filed on Oct. 10, 2018, each is incorporated herein by reference in its entirety.

TECHNICAL FIELD

The present invention relates to a device for additive manufacturing of components or 3D printing, in particular for an SLM process, in which SLM is the abbreviation for selective laser melting.

BACKGROUND

Selective laser melting (SLM) is a generative manufacturing process, which belongs to the group of beam melting processes. With selective laser melting, the material to be processed is distributed in powder form onto a base plate in a thin layer. By means of laser irradiation the material is melted in the respective locations necessary for producing the desired shape. After the material has solidified, a layer of solid material results. In a next step the base plate/machine table is lowered and newly coated with powder and again exposed to laser irradiation. This cycle is repeated until the finished component is produced. In the end the finished component is cleansed from excess powder and taken off the machine table.

For production of a component a given work space may be used. The work space can be oversized for the desired component, so that a large quantity of powder is necessary in order to carry out the process, however, the biggest part of the powder is not necessary to produce the component itself. Nevertheless, said powder is heated by the heating of the component and/or the machine table on which the component is produced and is thus reduced in quality for subsequent production cycles.

SUMMARY

Embodiments provide a device for producing a component by an additive process, in which only the smallest possible amount of powder is spent and/or becomes unusable.

The additive process may for example be the SLM or SLS process. The SLS process, the abbreviation SLS stands for selective laser sintering, is a generative production process, in which a component is produced layer by layer. In doing so, spatial structures are created from a material in powder form using a laser.

Furthermore, such a device is provided, that the component to be produced is not built up on the machine table but on an assembly, so that the component does not have to be separated from the machine table by a mechanical process, e.g. by disc grinding or sawing.

As first embodiment of the invention a device for producing a component using an additive process is provided, comprising: an element for producing a component and an assembly for at least partially receiving the element, wherein the component is additively built up on the element and/or wherein in the assembly an embedding mass for thermal insulation and/or fastening the element is provided.

By means of the embodiment of the invention by additively printing the component on an element or semi-finished component, a support structure otherwise necessary in additive processes can be omitted.

The device is formed in such a way, that powder which is not needed is isolated from the heated machine table and wherein an element for producing a component is disposed in a receptacle, so that a component may be additively built up on the element, wherein within the device a means may be present, in which the element is at least partially embedded, whereby the element is mechanically supported.

Exemplary embodiments are described in the dependent claims.

According to an also exemplary embodiment of the invention, a device is provided, wherein the element is embedded by the embedding mass and thereby mechanically fastened.

From the element and the component may result a hybrid component. The element may for example have been formed in a non-additive production process, for example by milling or turning. Prior to the start of the additive process the element may be treated with a mixture of various heat-conducting and anti-corrosive additives, in order to ensure that the additive process does not negatively affect the quality of the component.

Furthermore, prior to the start of the process the thermal insulation and/or the fastening embedding mass may be coated with a surface sealing material. This results in the thermal insulation and/or the fastening embedding mass not causing any impurities in the powder (still to be processed) and/or the work space. Because of this impurities can also be avoided in reused powder and consistent component quality can be ensured.

The assembly for installation of the elements may take place on multiple levels. Usually on a machine table a base plate is fastened, which is in direct contact with the elements. Thereby for example a heat transfer from the heatable machine table up to the element is ensured. Thereby temperature may be introduced into the elements in a targeted way.

In a further embodiment an insulating layer, which is implemented by the embedding mass, is disposed between multiple elements and/or the machine table. This is to avoid the potential heating of the non-processed filling powder in the powder bed and at the same time ensure a fastening of the elements.

The embedding mass may be curable, whereby securely fastening and positioning the elements in the work space is ensured.

In a further embodiment a heat conducting foil may additionally be placed between the machine table and the element.

Furthermore, a location fit between the element and the heat conducting foil/material/tub may enable an additional positioning/fastening of the element. This serves for the digital model being precisely built up on the element as well as for stress transfer from the element to the heat conducting foil/material/tub.

According to an exemplary embodiment of the invention a device it provided, wherein the embedding mass has a coefficient of thermal expansion which is equal to or higher than that of the element.

In a further exemplary embodiment, a device is provided, wherein the coefficient of thermal expansion of the putty is lower than that of the element and/or wherein the coefficient of thermal expansion of the component is different from that of the element.

By means of a higher coefficient of thermal expansion of the embedding mass it is ensured, that the fastening function of the embedding mass with respect to the element is fulfilled.

According to a further exemplary embodiment of the present invention a device is provided, wherein the material properties of the component are inhomogeneous and/or wherein the embedding mass is a compound of a ceramic part and a non-ceramic part.

According to an exemplary embodiment of the invention a device is provided, wherein the process is suited for selective laser melting (SLM) or selective laser sintering (SLS).

In a further embodiment of the invention a device is provided, wherein the device is disposed within the work space of an additive process, wherein the component is produced within the work space.

According to a further exemplary embodiment of the present invention a device is provided, wherein the embedding mass is a thermal insulation, in order to save unprocessed powder from heat during the additive production process.

In a further embodiment according to the invention a device is provided, wherein the element is treated with a mixture of various heat conducting and anticorrosive additives prior to the start of the process and/or wherein the embedding mass is covered with a surface sealing material prior to the start of the process.

Thus, it is avoided that the powder is contaminated by the embedding mass.

According to a further exemplary embodiment of the present invention a device is provided, wherein a location fit between the element and the heat conducting foil/material/tub enables positioning the element and/or wherein a foil is disposed between the element and the component, whereby separating component and element is made easier or unnecessary, because the component and the element are present separately.

In order to reuse any non-melted powder of the additive process, an unintended heating of the powder has to be prevented. By using an additional insulating layer, the powder, which is for example not disposed in close proximity of the elements or the component, can be protected from unintended heat exposure.

It may be considered an embodiment of the invention to provide a device, which reduces the amount of powder spent in an additive process and furthermore facilitates separating the finished component from the machine table.

In a further embodiment of the invention the embedding mass may be formed inhomogeneous with respect to its thermal conductivity, so that a heat exposure of the component occurs in different ways and non-uniform. Thus, an inhomogeneous formed component may be produced, which is for example characterized by areas of different toughness and/or hardness.

A further embodiment of the invention is the printing of the component on a thin foil, which is stretched over the element prior to the start of the process. This assembly (element equipped with foil) is, as in the previously described embodiment, fastened in its entirety, by means of the embedding mass, which may be present as a curable embedding mass, to the base plate.

The individual features may of course be combined with each other, whereby in part advantageous effects may result, which surpass the sum of individual effects.

BRIEF DESCRIPTION OF THE DRAWINGS

Further details and advantaged of the invention will be apparent from the exemplary embodiments illustrated in the drawings, which show

DETAILED DESCRIPTION OF ILLUSTRATIVE EMBODIMENTS

Figure 1:
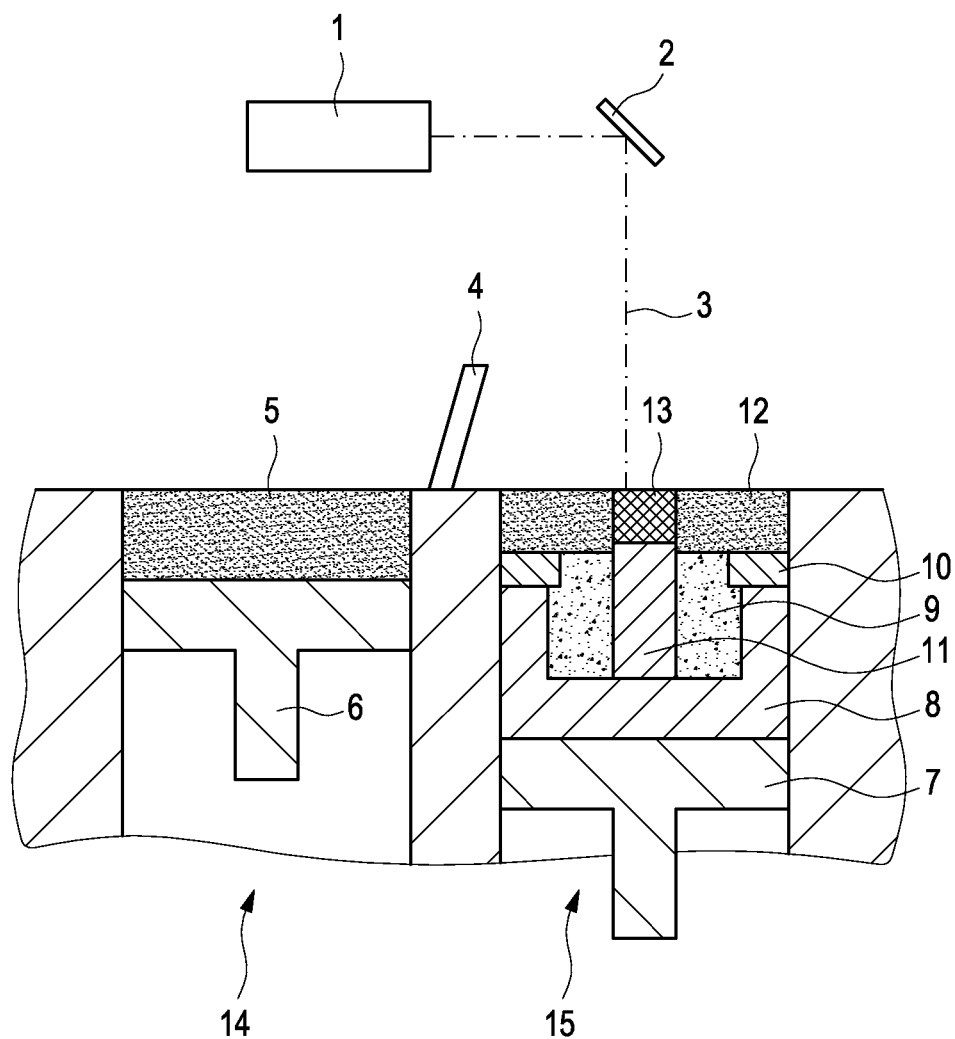
FIG. 1 shows a device for selective laser melting (SLM)

FIG. 1 shows a device for selective laser melting, wherein a powder depot 14 having a lift table 6 is provided. In order to supply a powder 5, the lift table is driven upwards, whereby a metered amount of powder 5 can be transferred by a wiper 4 from the powder depot 14 to the area 15, in which the component is fused by a precisely introduced laser beam. The next layer is created by the machine table 7 being lowered and by the wiper 4 filling a new layer of powder 5 into the resulting depression. By means of a laser 1, a laser irradiation 3 results in certain locations of the powder bed 12. In said locations of the powder bed 12 a molten bath/microstructural change of the powder 5 results, which leads to a solidification after cooling. Thus, a component of the desired shape may be produced. After a laser irradiation process the machine table 7 is again lowered and the resulting depression is again filled up with powder from the powder depot 14 by means of the wiper 4. The process is repeated for so long until the component 13 is completed. Next the component 13 is removed from the area 15 and cleansed from powder.

The device comprises a heat conducting mold 8, which can be formed as a tub or a heat conducting foil/material. In the tub 8 an element 11 can be disposed, which can constitute a part of the completed component or which can only be provided for heat conduction to the component 13. In any case the element 11 serves for heat of the machine table 7 being directed to the component 13, so that the additive/SLM/SLS process may be used. The tub 8 is filled with a thermal insulation and/or a bedding embedding mass 9, which is insulating from heat. Furthermore, in addition a thermal insulation and/or a bedding embedding mass 9 may be provided, which is additionally/also heat-insulating. By means of the embedding mass 9, which can be present as a curable composite, it is ensured, that the powder 12, which is not necessary for production of the component 13, is not heated and thus can be reused for subsequent production cycles without reduction in quality.

Figure 2:
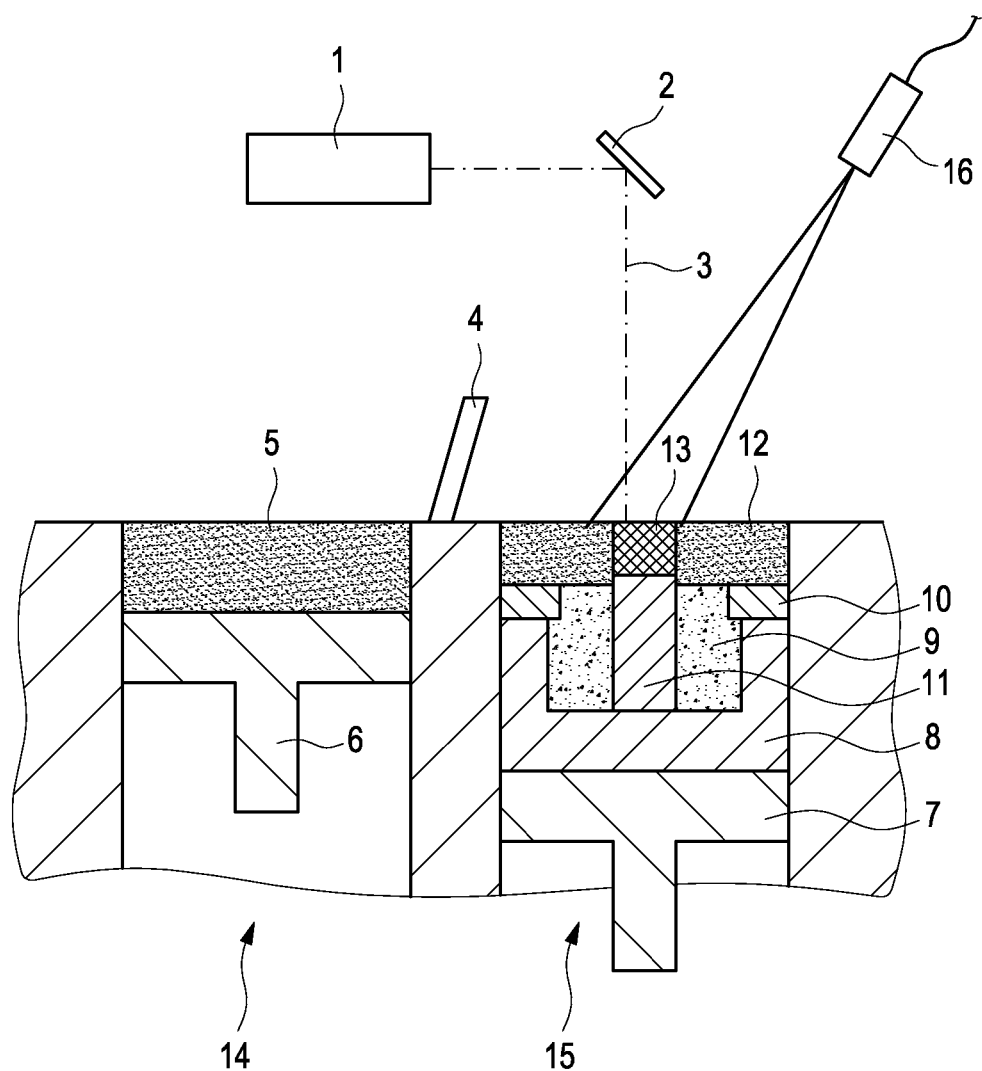
FIG. 2 shows a device having a measuring system 16 (camera/laser/gauge) for positioning.

FIG. 2 shows a device, wherein a camera 16 localizes the position of the element 11, so that the mirror 2 can adjust the laser beam 3 in such a way that the component is in fact produced on the element 11, and not next to it, by the additive process.

The advantages of the device result from the powder 12 not being damaged and thus being available for subsequent production processes. Moreover, the component 13 is directly applied onto the element 11, which, with the component 13, constitutes the complete component to be created or which can be removed from the component 13 in a simple manner. A complex removal for example by disc grinding the component 13 from the machine table can be omitted.

Figure 3:
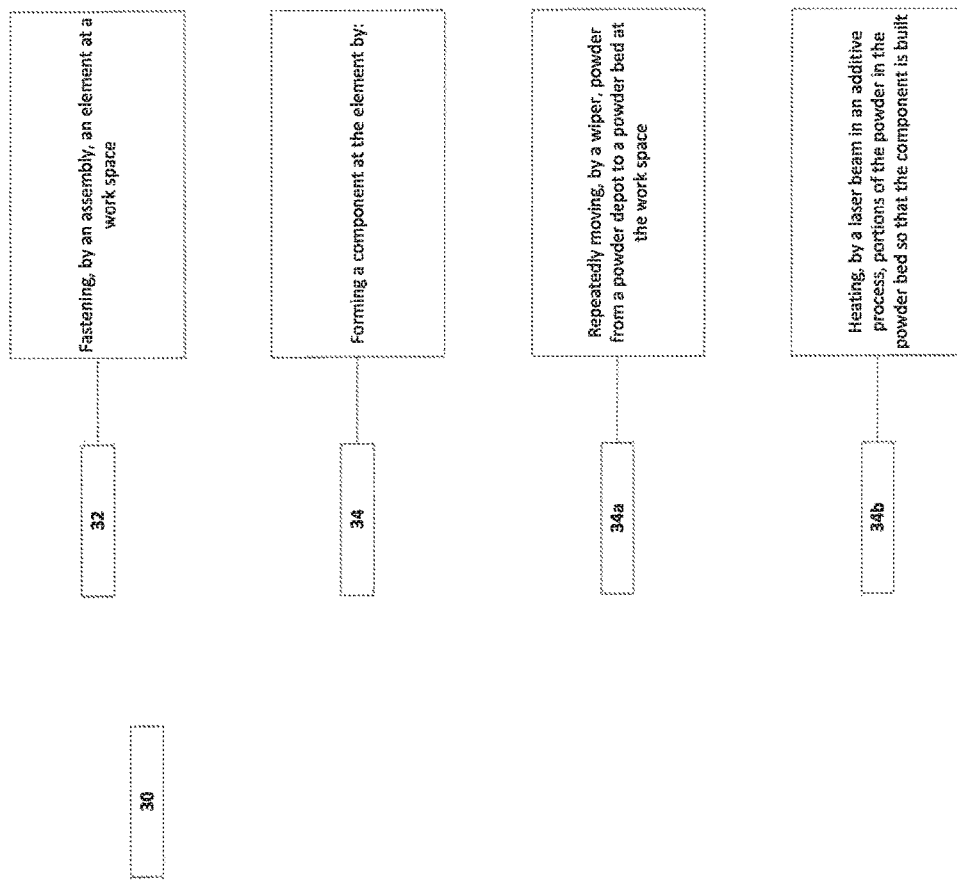
FIG. 3 shows a method for making a component.

FIG. 3 shows a method 30 for making a component. The method 30 is performed at a device. The device comprises a powder depot, a work space and a laser, wherein the work space comprises a powder bed and an assembly, and wherein the assembly comprises a thermally insulating embedding mass and a heat conducting mold. The method 30 includes, at 32, fastening, by the assembly, an element at the work space and forming the component at 34 at the element. Forming the component includes repeatedly moving, at 34a, by a wiper, powder from the powder depot to the powder bed at the work space and heating, at 34b, by a laser beam of the laser in an additive process, portions of the powder in the powder bed so that the component is built on the element, wherein the additive process comprises selective laser melting (SLM) or selective laser sintering (SLS), and wherein the embedding mass is independent and distinct from the powder and the component.

Figure 4:
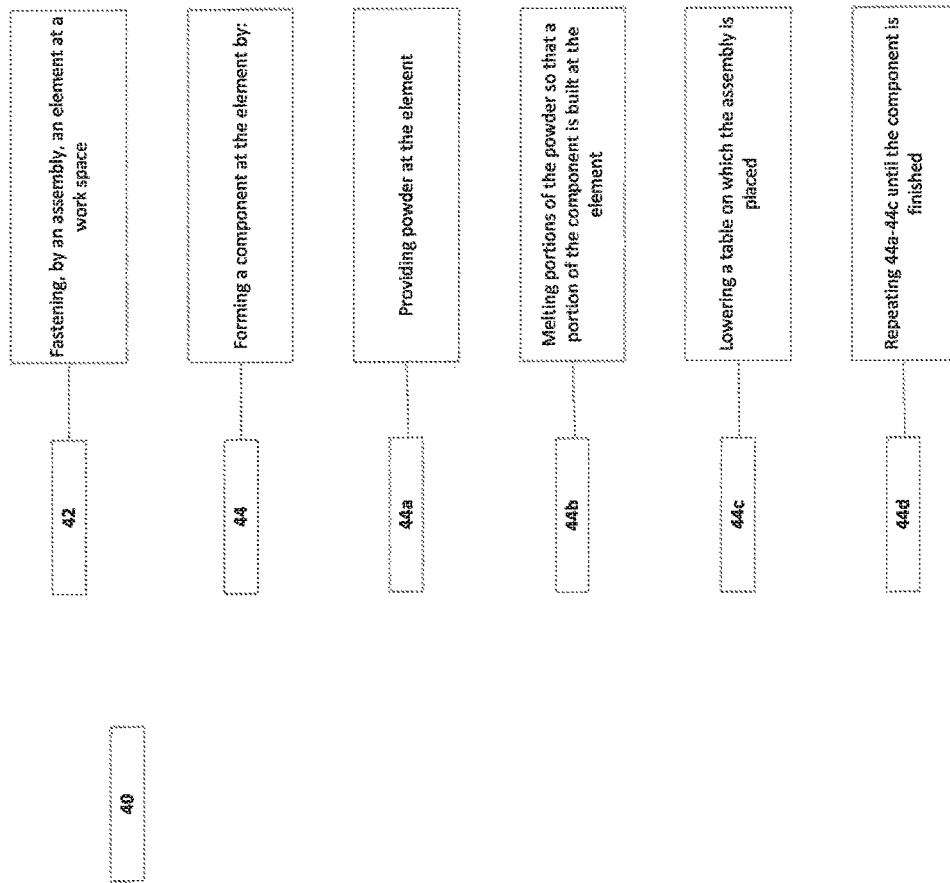
FIG. 4 shows a further method for making a component.

FIG. 4 illustrates a method 40 for making a component. The method 40 includes fastening, at 42, by an assembly, an element at a work space, wherein the assembly comprises a thermally insulating embedding mass and a heat conducting mold and forming the component at 44 at the element. Forming the component further includes providing, at 44a, powder at the element, melting, at 44b, portions of the powder so that a portion of the component is built at the element, wherein melting comprises selective laser melting (SLM) or selective laser sintering (SLS), lowering, at 44c, a table on which the assembly is placed and repeating, at 44d, 44a-44c until the component is finished, wherein the embedding mass is independent and distinct from the powder and the component.

It shall be mentioned, that the term "comprise" does not preclude additional elements or process steps, just as the term "a" and "an" does not preclude multiple elements and steps.

The invention claimed is:

1. A method for making a component at a device, wherein the device comprises a powder depot, a work space and a laser, wherein the work space comprises a powder bed and an assembly, and wherein the assembly comprises a thermally insulating embedding mass and a heat conducting mold, the method comprising:
fastening, by the assembly, an element at the work space; and
forming the component at the element by:
repeatedly moving, by a wiper, powder from the powder depot to the powder bed at the work space; and
heating, by a laser beam of the laser in an additive process, portions of the powder in the powder bed so that the component is built on the element,
wherein the additive process comprises selective laser melting (SLM) or selective laser sintering (SLS), and
wherein the embedding mass is independent and distinct from the powder and the component.

2. The method according to claim 1, wherein the element is a semi-finished component, and wherein the semi-finished component and the component form a finished component.

3. The method according to claim 1, wherein the embedding mass is a ceramic component.

4. The method according to claim 1, further comprising:
placing a foil on the element before forming the component;
after forming the component on the foil, cooling the element and the component; and
separating the component and the foil from the element.

5. The method according to claim 1, further comprising lowering a table on which the assembly with the element is located in a vertical direction after each wiper move.

6. The method according to claim 5, wherein the table is a heatable table.

7. The method according to claim 1, wherein the heat conducting mold is arranged between the embedding mass and a vertically movable table on which the heat conducting mold is located.

8. The method according to claim 7, wherein the heat conducting mold is arranged directly on the table, wherein the element is arranged directly on the heat conducting mold, and wherein the embedding mass is arranged directly on the heat conducting mold and adjacent to the element.

9. The method according to claim 1, further comprising heating, by a table, the element so that the embedding mass of the assembly prevents heating of the powder.

10. The method according to claim 1, further comprising preventing, by the embedding mass, heating near the element.

11. The method according to claim 1, further comprising identifying, by a camera of the device, a position of the element so that a mirror is able to adjust the laser beam in order to produce the component at the element.

12. The method according to claim 1, wherein the heat conducting mold comprises a partially heat insulating layer.

13. The method according to claim 1, wherein the element is coated with an anticorrosive layer.

14. The method according to claim 1, wherein the embedding mass has a coefficient of thermal expansion equal to or higher than a coefficient of thermal expansion of the element.

15. The method according to claim 1, further comprising, prior to fastening the element, treating the element with a mixture of heat conducting and anticorrosive additives.

16. The method according to claim 1, further comprising, prior to fastening the element, coating the embedding mass with a surface sealing material.

17. The method according to claim 1, further comprising curing the embedding mass prior to forming the component at the element.

18. A method for making a component, the method comprising:
fastening, by an assembly, an element at a work space, wherein the assembly comprises a thermally insulating embedding mass and a heat conducting mold; and
forming the component at the element by:
(a) providing powder at the element;
(b) melting portions of the powder so that a portion of the component is built at the element, wherein melting comprises selective laser melting (SLM) or selective laser sintering (SLS);
(c) lowering a table on which the assembly is placed; and
(d) repeating (a)-(c) until the component is finished,
wherein the embedding mass is independent and distinct from the powder and the component.

19. The method according to claim 18, further comprising heating, by the table, the element so that the embedding mass of the assembly prevents heating of the powder.

20. The method according to claim 18, further comprising preventing, by the embedding mass, heating near the element.

21. The method according to claim 18, wherein the element is a semi-finished component, and wherein the semi-finished component and the component form a finished component.

22. The method according to claim 18, further comprising:
  placing a foil on the element before forming the component;
  after forming the component on the foil, cooling the element and the component; and
  separating the component and the foil from the element.

\* \* \* \* \*